No. 670,085. Patented Mar. 19, 1901.
H. A. SPILLER.
DRIVING AND STEERING GEAR FOR MOTOR VEHICLES.
(Application filed May 12, 1900.)
(No Model.) 2 Sheets—Sheet 1.
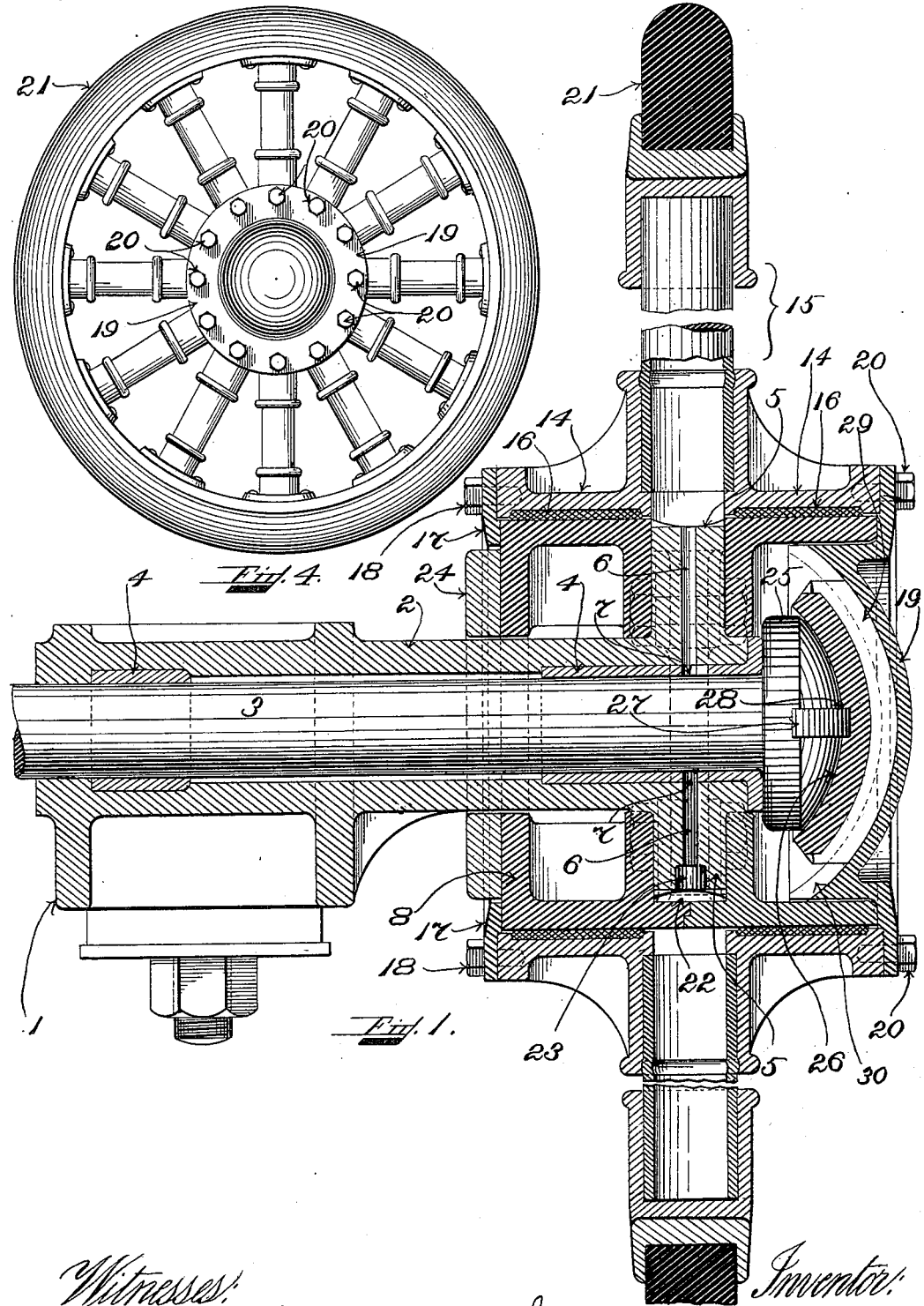

No. 670,085. Patented Mar. 19, 1901.
H. A. SPILLER.
DRIVING AND STEERING GEAR FOR MOTOR VEHICLES.
(Application filed May 12, 1900.)
(No Model.) 2 Sheets—Sheet 2.
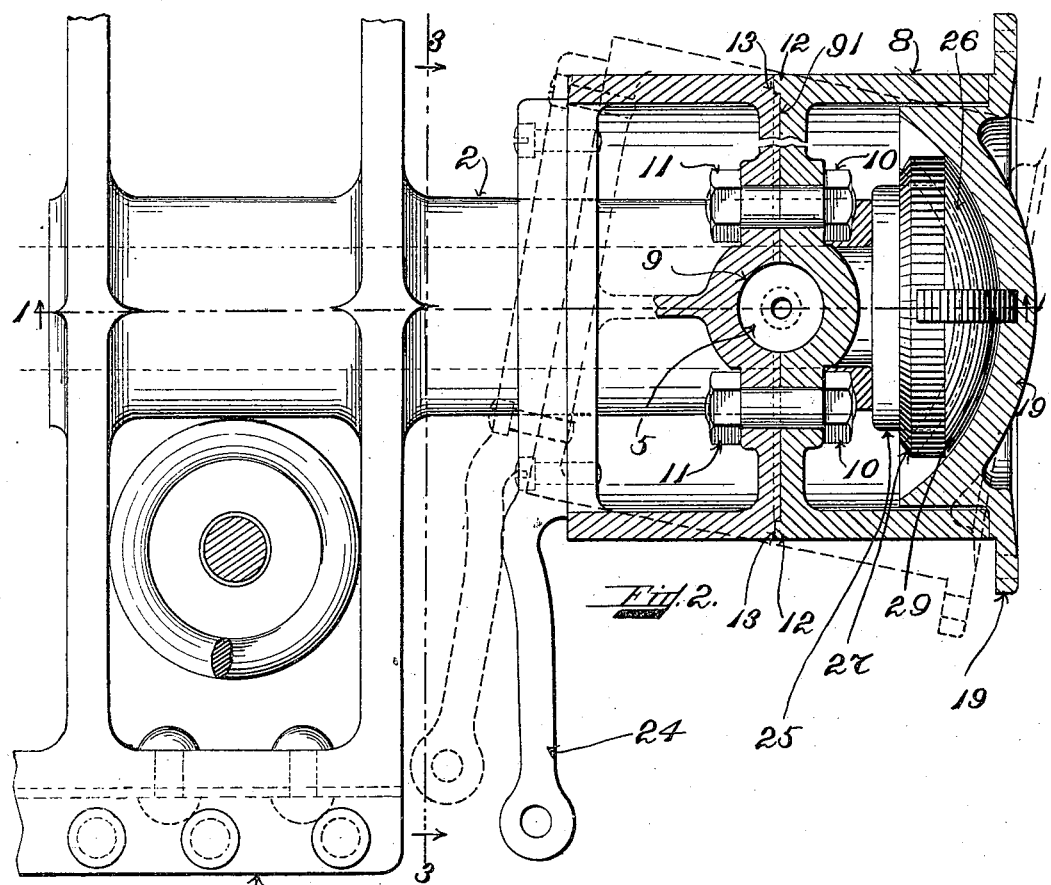
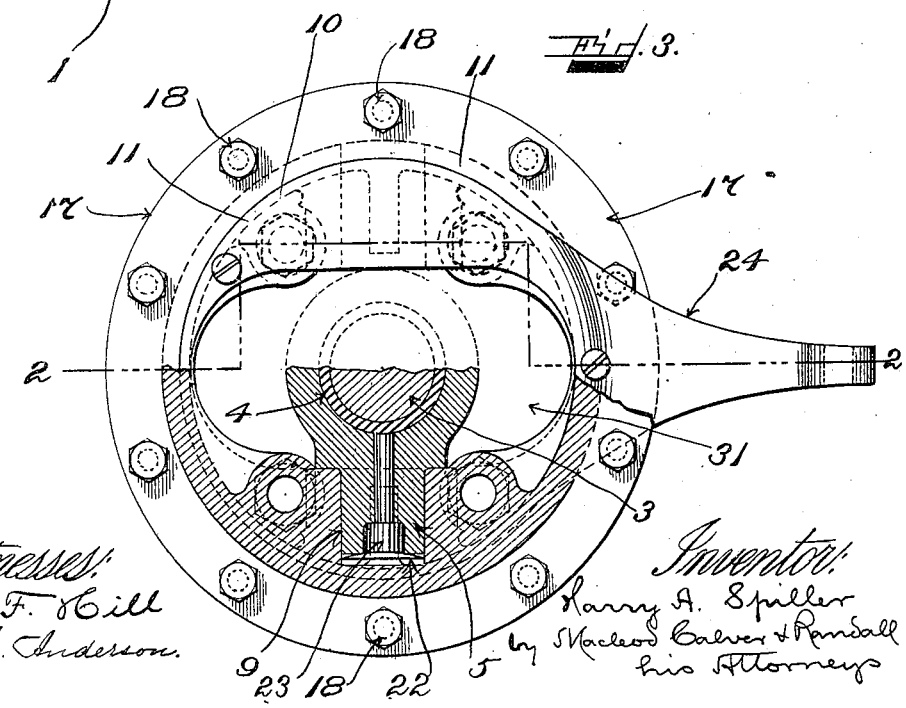

UNITED STATES PATENT OFFICE.

HARRY A. SPILLER, OF BOSTON, MASSACHUSETTS.

DRIVING AND STEERING GEAR FOR MOTOR-VEHICLES.

SPECIFICATION forming part of Letters Patent No. 670,085, dated March 19, 1901.

Application filed May 12, 1900. Serial No. 16,445. (No model.)

*To all whom it may concern:*

Be it known that I, HARRY A. SPILLER, a citizen of the United States, residing at Boston, in the county of Suffolk, State of Massachusetts, have invented a certain new and useful Improvement in Driving and Steering Gear for Motor-Vehicles, &c., of which the following is a specification, reference being had therein to the accompanying drawings.

My invention is especially useful in connection with the driving and steering gear of self-propelled vehicles.

The invention consists in improved means for mounting a wheel in connection with a shaft so as to permit of change or adjustment of the angle of inclination of one thereof with relation to the other and for transmitting driving power from one to the other thereof in all positions of the wheel and shaft relatively to each other, all as will now be described with reference to the drawings, in which latter I have illustrated an embodiment of the invention.

In the drawings, Figure 1 is a view, mainly in longitudinal section on a vertical plane passing through the line 1 1 of Fig. 2, showing part of a driving-shaft, a rigid hollow sleeve or arm provided with internal bearings for the said shaft, a wheel, an adjustable wheel-mounting applied to the said rigid sleeve or arm, and the means whereby the shaft and wheel are placed in driving connection with each other. Fig. 2 is a plan of some of the parts that are represented in Fig. 1, the wheel being omitted and the wheel-mounting being in section on the plane indicated by the dotted line 2 2 in Fig. 3. Fig. 3 is a view, partly in vertical section on line 3 3, Fig. 2, and partly in vertical section on a plane passing through the trunnions, of the wheel-mounting. Fig. 4 is an elevation, on a reduced scale, looking from the right-hand side in Fig. 1.

Having reference to the drawings, 1 designates a portion of the framework of a vehicle, and 2 is a rigid sleeve or arm forming part thereof or applied thereto in any suitable manner. 3 is a shaft extended through the said sleeve or arm 2 and turning in bearings 4 4, fitted to the latter. In practice the said shaft will be rotated by power suitably transmitted thereto, the means of actuating the shaft not needing to be shown, since it is not directly involved in the invention. At its outer extremity the sleeve or arm 2 is furnished with vertical trunnions 5 5, extending oppositely in line with each other. Each of these trunnions is bored centrally to form a longitudinal oil-passage 6. The two oil-passages 6 6 register with holes 7 7 in the bearing 4 at the said extremity of the sleeve or arm 2. Oil poured into the upper oil-passage 6 will find its way to the shaft 3, and a portion thereof will pass into the lower oil-passage 6 and thence to the step-bearing at the free end of the lower trunnion 5. To the said outer extremity of the sleeve or arm 2 I apply the wheel-mounting 8. This last is formed with bearings 9 9 to receive and fit the vertical trunnions 5 5, and it is arranged to swing on said trunnions in a horizontal plane. For convenience in constructing and assembling the parts the wheel-mounting is formed in two portions, as clearly indicated in Fig. 2, fitting together on a transverse plane 9', that bisects the bearings 9 9. The said portions are clamped together by means of bolts 10 10 and nuts 11 11 after having been fitted properly together around the rigid sleeve or arm 2 and its trunnions 5 5. For the purpose of insuring proper register of the halves of the said two-part wheel-mounting with relation to each other the meeting face of one thereof is formed around its periphery with a projecting lip 12 and the meeting face of the other with a corresponding groove 13, receiving the said lip.

The exterior of the wheel-mounting 8 is turned to receive the hub 14 of the wheel 15, the eye of the said hub being lined with Babbitt metal or the like, as at 16 16, Fig. 1. Any other form of bearing, antifriction or otherwise, may be employed. A ring 17, held by bolts 18 18 to the inner end of the hub 14, overlaps somewhat the inner end of the wheel-mounting 8 and holds the hub from slipping outwardly off the wheel-mounting. A head 19, held by bolts 20 20 to the outer end of the hub, covers the outer end of the wheel-mounting and by contact with the edge of the wheel-mounting holds the hub from slipping inwardly.

The centers of the trunnions 5 5 are substantially in line with the middle of the width of the tire 21 of the wheel.

Within the lower bearing 9 of the wheel-mounting 8 I place a disk 22, having a convex upper face, to constitute a step that shall take the vertical pressure that is transmitted through the lower trunnion 5. The said trunnion has a plug or block 23, fitted within an enlargement of the lower end of its oil-passage 6 and arranged to bear upon the convex face of the disk 22. By this means I provide for enabling the wheel-mounting to be turned with facility relatively to the sleeve or arm 2 and its trunnions even when the heaviest of loads are being supported.

24 is an arm that is held by bolts 25 25 to the inner end of the wheel-mounting. In practice the said arm is designed to have attached thereto connections for enabling the wheel-mounting and wheel to be turned upon the trunnions 5 5 as required in steering the vehicle to which the invention is applied. The dotted lines in Fig. 2 show the wheel-mounting shifted into an oblique position.

The power connections intermediate the shaft 3 and the wheel 15 comprise the head 25 on said shaft, the head 19, attached to the wheel, as already described, and one or more loose or floating connector-plates 26, interposed between the said heads. The outer face of head 25 is convex, the inner face of head 19 is concave, and the connector-plate 26 is concavo-convex to fit the said faces of the two heads. The said convex face of head 25 is in effect a segment of a sphere having its center substantially at the point of intersection of the horizontal axis of the shaft 3 with the vertical axis of the trunnions 5 5. The concave face of the head 19 is in effect a segment of a hollow sphere having its center at substantially the same point. The concentricity of the contacting faces of the heads 25 and 19 and connector-plate enables such parts to be moved freely with relation to one another in all directions about their common center. The head 25 is furnished with a key 27, which projects from its convex face and extends diametrically across the latter. The outer edge of this key is concentric with the segmental parts which have just been described. The key 27 works in a diametrical keyway 28, which is formed in the concave face of the connector-plate. A similar diametrically-extending key 29 is applied to the convex face of the connector-plate, it having a concentric outer edge and working in a diametrical keyway 30 in the concave face of the head 19. The two keys are disposed at right angles to each other.

By means of the key-and-keyway connection of the two segmental heads and the connector-plate with one another the parts in question are compelled to rotate in unison, and rotary motion thereby is transmitted from the shaft 3 to the wheel 15 in all positions of adjustment of the wheel-mounting and wheel.

For the purpose of permitting the wheel-mounting to be swung horizontally upon the trunnions 5 5 the inner head of said wheel-mounting and the wider inner portion of the steering-arm 24 are formed with horizontally-elongated openings, as at 31, Fig. 3, to make clearance for the sleeve or arm 2.

Devices constructed in accordance with my invention are very compact, the amount of space occupied thereby being reduced to the minimum. They possess great simplicity and strength and are characterized by durability and efficiency. The friction that is incident to the operation thereof is minimized. Toothed gearing is dispensed with, reducing vibration and requiring less power. The adjustment of the wheel-mounting and wheel into different positions relative to the shaft is capable of being effected with very little effort. In consequence of effecting such adjustment about a vertical axis located at substantially the middle of the width of the tire the wheel is caused to swing or pivot at the point at which the wheel rests upon the ground, thereby obviating the resistance and overcoming the vibrating motion usually felt at the steering handle or wheel when the pivot or fulcrum on which the wheel is swung is located elsewhere than at such point.

As will be obvious, some of the features of my invention are adapted to be used elsewhere than in connection with self-propelling vehicles, and consequently I do not limit myself in all respects to the employment of the invention in such vehicles.

The illustrated embodiment of the invention contains a single connector or plate. By the use of two or more connector-plates in key-and-keyway connection with each other a wider range of swinging movement of the wheel relatively to the shaft will be permitted. The action will be obvious.

I claim as my invention—

1. In combination, the shaft, the rigid bearing-support for said shaft fitting and supporting the latter in the plane of the pivots of the wheel-mounting, the adjustable wheel-mounting surrounding said rigid bearing-support and pivotally supported at the exterior of the latter, the wheel applied to the said wheel-mounting, and power-transmitting devices operatively connecting the said shaft and said wheel and serving to transmit power from one to the other thereof in all positions of adjustment, substantially as described.

2. In combination, the shaft having a head, the rigid hollow sleeve or arm provided with internal bearings for the shaft, the adjustable wheel-mounting adjustably supported at the exterior of the said sleeve or arm, the wheel applied to the said wheel-mounting and having a head connected therewith, and the loose plate in key-and-keyway engagement with the said heads and serving for the transmission of power, substantially as described.

3. In combination, the shaft, the pivotally-supported wheel-mounting, the wheel applied to the said wheel-mounting, and power-transmitting connections comprising heads connected with the shaft and wheel, respectively, having segment-shaped faces, and the intermediate floating connector in key-and-keyway engagement with the said faces, substantially as described.

4. In combination, the shaft having the convex head, the pivotally-supported wheel-mounting, the wheel applied to the said wheel-mounting, having the concave head, and the floating concavo-convex connector in key-and-keyway engagement with the said heads, substantially as described.

5. In combination, the shaft having the convex head, the bearing-support for the said shaft, the wheel-mounting pivotally supported at the exterior of the bearing-support, the wheel applied to the said wheel-mounting having the concave head, and the floating concavo-convex connector in key-and-keyway engagement with the said heads, substantially as described.

6. In combination, in a motor-vehicle, the driving-shaft, the rigid bearing-support for said shaft, fitting and supporting the latter in the plane of the axis of the wheel-mounting, and also of the tire of the wheel, the wheel, the adjustable wheel-mounting pivoted on a vertical axis substantially at the middle of the width of the tire of the wheel, and means to transmit power from said shaft to said wheel in all positions of said wheel-mounting, substantially as described.

7. In combination, in a motor-vehicle, the driving-shaft, the wheel, the adjustable wheel-mounting, the bearing-sleeve with which said wheel-mounting is connected by vertical trunnions, the said bearing-sleeve supporting the said driving-shaft in the plane of the said trunnions and means to transmit power from said shaft to said wheel in all positions of said wheel-mounting, substantially as described.

8. In combination, in a motor-vehicle, the driving-shaft, the wheel, the adjustable wheel-mounting, the bearing-sleeve with which said wheel-mounting is connected by vertical trunnions within the wheel-hub, the said bearing-sleeve supporting the said driving-shaft in the plane of the said trunnions and means to transmit power from said shaft to said wheel in all positions of said wheel-mounting, substantially as described.

9. In combination, in a motor-vehicle, the driving-shaft with its head, the wheel with its head, the adjustable wheel-mounting pivoted on a vertical axis substantially at the middle of the width of the tire of the wheel, and the loose plate serving as a connector between the said heads in the transmission of power from the shaft to the wheel, substantially as described.

10. In combination, the driving segment-shaped head, the driven segment-shaped head, and the floating concavo-convex connector-plate intermediate said heads and transmitting power from one to the other in all positions of the same relative to each other, substantially as described.

11. In combination, the shaft, the rigid bearing-support for said shaft, fitting and supporting the latter in the plane of the tire of the wheel, the adjustable wheel-mounting surrounding the said rigid bearing-support and pivotally supported at the exterior of the latter, the wheel applied to the said wheel-mounting, and power-transmitting devices operatively connecting the shaft and wheel beyond the said bearing-support and serving to transmit power from one to the other thereof in all positions of adjustment, substantially as described.

12. In combination, in a vehicle, the shaft, the rigid bearing-support for said shaft, the adjustable wheel-mounting surrounding said rigid bearing-support and pivotally supported at the exterior of the latter by means of a trunnion on the one fitted to a bearing and step provided on the other, the wheel applied to the said wheel-mounting, and power-transmitting devices operatively connecting the said shaft and wheel and serving to transmit power from one to the other thereof in all positions of adjustment, substantially as described.

In testimony whereof I affix my signature in presence of two witnesses.

HARRY A. SPILLER.

Witnesses:
   CHAS. F. RANDALL,
   WM. A. MACLEOD.